(12) United States Patent
Baldwin et al.

(10) Patent No.: US 10,108,984 B2
(45) Date of Patent: Oct. 23, 2018

(54) DETECTING BODY LANGUAGE VIA BONE CONDUCTION

(71) Applicant: AT&T Intellectual Property I, L.P., Atlanta, GA (US)

(72) Inventors: Christopher Baldwin, Crystal Lake, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 338 days.

(21) Appl. No.: 14/065,663

(22) Filed: Oct. 29, 2013

(65) Prior Publication Data
US 2015/0120465 A1    Apr. 30, 2015

(51) Int. Cl.
| | |
|---|---|
| *G06F 21/32* | (2013.01) |
| *H04W 12/10* | (2009.01) |
| *H04L 29/06* | (2006.01) |
| *G06Q 30/02* | (2012.01) |
| *H04W 12/12* | (2009.01) |
| *G06K 9/00* | (2006.01) |

(52) U.S. Cl.
CPC ..... *G06Q 30/0269* (2013.01); *H04L 63/0853* (2013.01); *H04L 63/0861* (2013.01); *H04L 63/1416* (2013.01); *H04L 63/1466* (2013.01); *H04W 12/12* (2013.01); *G06K 2009/00939* (2013.01); *H04L 2463/121* (2013.01)

(58) Field of Classification Search
None
See application file for complete search history.

(56) References Cited

U.S. PATENT DOCUMENTS

| | | |
|---|---|---|
| 3,629,521 A | 12/1971 | Puharich et al. |
| 4,048,986 A | 9/1977 | Ott |
| 4,340,778 A | 7/1982 | Cowans et al. |
| 4,421,119 A | 12/1983 | Pratt |
| 4,720,607 A | 1/1988 | de Moncuit |
| 4,754,763 A | 7/1988 | Doemland |
| 4,799,498 A | 1/1989 | Collier |

(Continued)

FOREIGN PATENT DOCUMENTS

| | | |
|---|---|---|
| AU | 2003257031 | 2/2004 |
| AU | 2007200415 | 8/2007 |

(Continued)

OTHER PUBLICATIONS

U.S. Office Action dated Mar. 8, 2010 in U.S. Appl. No. 11/586,142.

(Continued)

*Primary Examiner* — Fonya M Long
*Assistant Examiner* — Rashida Shorter
(74) *Attorney, Agent, or Firm* — Hartman & Citrin LLC

(57) ABSTRACT

Concepts and technologies are disclosed herein for detecting body language via bone conduction. According to one aspect, a device can detect body language of a user. The device can generate a signal and send the signal to a sensor network connected to a user. The device can receive a modified signal from the sensor network and compare the modified signal to a body language reference model. The device can determine the body language of the user based upon comparing the modified signal to the body language reference model.

17 Claims, 11 Drawing Sheets

(56) References Cited

U.S. PATENT DOCUMENTS

| | | |
|---|---|---|
| 4,988,981 A | 1/1991 | Zimmerman et al. |
| 5,024,239 A | 6/1991 | Rosenstein |
| 5,073,950 A | 12/1991 | Colbert et al. |
| 5,125,313 A | 6/1992 | Hiyoshi |
| 5,319,747 A | 6/1994 | Gerrissen et al. |
| 5,327,506 A | 7/1994 | Stites, III |
| 5,368,044 A | 11/1994 | Cain et al. |
| 5,495,241 A | 2/1996 | Doing et al. |
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,766,208 A | 6/1998 | Mcewan |
| 5,810,731 A | 9/1998 | Sarvazyan et al. |
| 5,813,406 A | 9/1998 | Kramer |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A | 11/2000 | Bartlett |
| 6,154,199 A | 11/2000 | Butler |
| 6,213,934 B1 | 4/2001 | Bianco |
| 6,234,975 B1 | 5/2001 | Mcleod et al. |
| 6,336,045 B1 | 1/2002 | Brooks |
| 6,380,923 B1 | 4/2002 | Fukumoto et al. |
| 6,396,930 B1 | 5/2002 | Vaudrey et al. |
| 6,409,684 B1 | 6/2002 | Wilk |
| 6,507,662 B1 | 1/2003 | Brooks |
| 6,515,669 B1 | 2/2003 | Mohri |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,844,660 B2 | 1/2005 | Scott |
| 6,898,299 B1 | 5/2005 | Brooks |
| 6,912,287 B1 | 6/2005 | Fukumoto |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,922,427 B2 | 12/2014 | Dehnie et al. |
| 9,031,293 B2 * | 5/2015 | Kalinli-Akbacak .... G10L 25/63 382/128 |
| 9,386,962 B2 | 7/2016 | Dahl |
| 2001/0013546 A1 | 8/2001 | Ross |
| 2001/0051776 A1 | 12/2001 | Lenhardt |
| 2003/0048915 A1 | 3/2003 | Bank |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0207599 A1 | 9/2005 | Fukumoto |
| 2005/0210269 A1 | 9/2005 | Tiberg |
| 2006/0018488 A1 | 1/2006 | Viala et al. |
| 2006/0132455 A1 | 6/2006 | Rimas-Ribikauskas |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0084859 A1 | 4/2008 | Sullivan |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0304210 A1 | 12/2009 | Weisman |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0276312 A1 | 11/2011 | Shalon |
| 2011/0280239 A1 | 11/2011 | Tung et al. |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0143693 A1 * | 6/2012 | Chung ............... G06Q 30/0269 705/14.66 |
| 2012/0202479 A1 | 8/2012 | Sugitani et al. |
| 2012/0212441 A1 | 8/2012 | Christiansson et al. |
| 2012/0280900 A1 | 11/2012 | Wang et al. |
| 2012/0290832 A1 | 11/2012 | Antequera Rodriguez et al. |
| 2013/0034238 A1 | 2/2013 | Abolfathi |
| 2013/0041235 A1 | 2/2013 | Rogers et al. |
| 2013/0097292 A1 | 4/2013 | Yoakum et al. |
| 2013/0119133 A1 | 5/2013 | Michael et al. |
| 2013/0120458 A1 | 5/2013 | Celebisoy et al. |
| 2013/0135223 A1 | 5/2013 | Shai |
| 2013/0142363 A1 | 6/2013 | Amento et al. |
| 2013/0170471 A1 | 7/2013 | Nix |
| 2013/0171599 A1 | 7/2013 | Bleich et al. |

(56) References Cited

U.S. PATENT DOCUMENTS

| | | |
|---|---|---|
| 2013/0173926 A1 | 7/2013 | Morese et al. |
| 2013/0212648 A1 | 8/2013 | Tietjen et al. |
| 2013/0215060 A1 | 8/2013 | Nakamura |
| 2013/0225915 A1 | 8/2013 | Redfield et al. |
| 2013/0225940 A1 | 8/2013 | Fujita et al. |
| 2013/0257804 A1 | 10/2013 | Vu et al. |
| 2013/0278396 A1 | 10/2013 | Kimmel |
| 2013/0288655 A1 | 10/2013 | Foruntanpour et al. |
| 2013/0346620 A1 | 12/2013 | Gizis et al. |
| 2014/0009262 A1 | 1/2014 | Robertson et al. |
| 2014/0028604 A1 | 1/2014 | Morinaga et al. |
| 2014/0035884 A1 | 2/2014 | Oh et al. |
| 2014/0097608 A1 | 4/2014 | Buzhardt et al. |
| 2014/0099991 A1 | 4/2014 | Cheng et al. |
| 2014/0107531 A1 | 4/2014 | Baldwin |
| 2014/0156854 A1 | 6/2014 | Gaetano, Jr. |
| 2014/0168093 A1 | 6/2014 | Lawrence |
| 2014/0168135 A1 | 6/2014 | Saukko et al. |
| 2014/0174174 A1 | 6/2014 | Uehara et al. |
| 2014/0188561 A1 | 7/2014 | Tenbrock et al. |
| 2014/0210791 A1 | 7/2014 | Hanauer et al. |
| 2014/0240124 A1* | 8/2014 | Bychkov ............ A61B 5/0026 340/539.12 |
| 2015/0084011 A1 | 3/2015 | Park et al. |
| 2015/0092962 A1 | 4/2015 | Amento et al. |
| 2015/0128094 A1 | 5/2015 | Baldwin et al. |
| 2015/0137936 A1 | 5/2015 | Baldwin et al. |
| 2015/0137960 A1 | 5/2015 | Baldwin et al. |
| 2015/0138062 A1 | 5/2015 | Baldwin et al. |
| 2015/0150116 A1 | 5/2015 | Baldwin et al. |
| 2015/0199950 A1 | 7/2015 | Heiman et al. |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 10/1990 |
| TW | 200946887 | 8/1997 |
| WO | WO 8201329 | 4/1982 |
| WO | WO 9601585 | 1/1996 |
| WO | WO 03033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision on Appeal dated Sep. 25, 2014 in U.S. Appl. No. 11/586,142.
Notice of Allowance dated Dec. 18, 2014 in U.S. Appl. No. 11/586,142.
U.S. Office Action dated Aug. 25, 2015 in U.S. Appl. No. 11/586,142.
U.S. Office Action dated Aug. 25, 2015 in U.S. Appl. No. 14/083,094.
U.S. Office Action dated Jun. 25, 2015 in U.S. Appl. No. 14/083,110.
U.S. Appl. No. 14/482,087, filed Sep. 10, 2014.
U.S. Appl. No. 14/482,091, filed Sep. 10, 2014.
U.S. Appl. No. 14/482,101, filed Sep. 10, 2014.
U.S. Appl. No. 14/482,078, filed Sep. 10, 2014.
U.S. Appl. No. 14/482,658, filed Oct. 15, 2014.
Travis et al., "Hambone: A bio-acoustic gesture interface," 2007 11th IEEE International Symposium on Wearable Computers, 2007.
Scanlon, Michael V. Acoustic sensor for health status monitoring. Army Research Lab Aberdeen Proving Ground MD, 1998.
Yamada, Guillaume Lopez; Masaki Shuzo; Ichiro. "New healthcare society supported by wearable sensors and information mapping-based services." International Journal of Networking and Virtual Organisations 9.3 (2011): 233-247.
Scanlon, Michael V. "Acoustic sensors in the helmet detect voice and physiology." AeroSense 2003. International Society for Optics and Photonics, 2003.
"Kinect Gestures," retrieved from http://support.xbox.com/en-US/xbox-360/kinect/body-controller on Oct. 24, 2013.
Kompis, Martin, and Rudolf Haeusler, "Electromagnetic interference of bone-anchored hearing aids by cellular phones revisited," Acta oto-laryngologica 122.5, 2002, 510-512.
Chris Harrison, Desney Tan, Dan Morris, "Skinput: Appropriating the Skin as an Interactive Canvas," CommuniCations of the ACM 54.8, 2011, 111-118.
T. Scott Saponas, et al., "Enabling always-available input with muscle-computer interfaces," Proceedings of the 22nd Annual ACM Symposium on User Interface Software and Technology, ACM, 2009.
Jao Henrique Donker, "The Body as a communication medium," 2009.
Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.
Vidya Bharrgavi, et al., "Security Solution for Data Integrity in Wireless BioSensor Networks," Distributed Computing Systems Workshops, 2007, ICDCSW'07, 27th International Conference, IEEE, 2007.
Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.
Zicheng Liu, et al., "Direct Filtering for Air-and Bone-Conductive Microphones," Multimedia Signal Processing, 2004 IEEE 6th Workshop, IEEE, 2004.
Mark Billinghurst, "Chapter 14: Gesture Based Interaction," Haptic Input, Aug. 24, 2011.
Non-final Office Action dated Jan. 29, 2014 in U.S. Appl. No. 13/309,124.
Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.
Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.
Yoo, Jerald, Namjun Cho, and Hoi-Jun Yoo. "Analysis of body sensor network using human body as the channel." Proceedings of the ICST 3rd international conference on Body area networks. ICST (Institute for Computer Sciences, Social-Informatics and Telecommunications Engineering), 2008.
Ni, Tao, and Patrick Baudisch. "Disappearing mobile devices." Proceedings of the 22nd annual ACM symposium on User interface software and technology. ACM, 2009.
Hinckley, Ken, and Hyunyoung Song, "Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.

(56) References Cited

OTHER PUBLICATIONS

Ruiz, J. Agud, and Shigeru Shimamoto. "A study on the transmission characteristics of the human body towards broadband intrabody communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body." IMCIC 2010.
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.
Office Action mailed in U.S. Appl. No. 13/309,124 dated Feb. 2, 2013.
Office Action mailed in U.S. Appl. No. 13/309,124 dated Sep. 24, 2013.
Amento et al., "The Sound of One Hand: A Wrist-Mounted Bio-Acoustic Fingertip Gesture Interface," Short Talk: It's All About Sound, Apr. 20, 2002, 724-725, ACM, Minneapolis, Minnesota, USA.
Zhong et al., "OsteoConduct: Wireless Body-Area Communication based on Bone Conduction," Proceedings of the ICST 2nd international conference on Body area networks, BodyNets 2007.
U.S. Office Action dated Nov. 19, 2015 in U.S. Appl. No. 14/083,499.
U.S. Office Action dated Nov. 19, 2015 in U.S. Appl. No. 14/090,668.
U.S. Office Action dated Jan. 11, 2016 in U.S. Appl. No. 14/514,658.
U.S. Office Action dated Feb. 25, 2016 in U.S. Appl. No. 14/072,126.
U.S. Notice of Allowance dated Apr. 4, 2016 in U.S. Appl. No. 14/083,499.
U.S. Notice of Allowance dated Mar. 21, 2016 in U.S. Appl. No. 14/090,668.
U.S. Office Action dated Mar. 16, 2016 in U.S. Appl. No. 14/482,087.
U.S. Office Action dated Mar. 10, 2016 in U.S. Appl. No. 14/482,091.
U.S. Office Action dated Jul. 7, 2016 in U.S. Appl. No. 14/072,126.
U.S. Notice of Allowance dated Jul. 12, 2016 in U.S. Appl. No. 14/482,091.
U.S. Office Action dated Sep. 14, 2016 in U.S. Appl. No. 14/482,101.
U.S. Office Action dated Oct. 20, 2016 in U.S. Appl. No. 14/482,078.
U.S. Office Action dated Dec. 14, 2016 in U.S. Appl. No. 14/561,549.
U.S. Notice of Allowance dated Oct. 7, 2016 in U.S. Appl. No. 15/224,808.
U.S. Office Action dated Jun. 1, 2017 in U.S. Appl. No. 14/482,078.
U.S. Office Action dated May 10, 2017 in U.S. Appl. No. 15/161,499.
U.S. Notice of Allowance dated Mar. 28, 2017 in U.S. Appl. No. 15/224,808.
U.S. Office Action dated Apr. 21, 2017 in U.S. Appl. No. 15/450,624.
U.S. Notice of Allowance dated Aug. 22, 2017 in U.S. Appl. No. 15/450,624.
U.S. Notice of Allowance dated Nov. 17, 2017 in U.S. Appl. No. 14/482,101.
U.S. Office Action dated Dec. 13, 2017 in U.S. Appl. No. 15/250,375.
Fukumoto et al., "Whisper: A Wristwatch Style Wearable Headset," CHI 99, May 1999, pp. 112-119.
Fukumoto et al., "Body Coupled FingeRing Wireless Wearable Keyboard," CHI 97, Mar. 1997, pp. 147-154.
Matsushita et al., "Wearable Key Device for Personalizing Nearby Environment, Proceedings of the Fourth International Symposium on Wearable Computers" (ISWC'00), Feb. 2000, pp. 1-8.
U.S. Office Action dated Apr. 5, 2018 in U.S. Appl. No. 15/250,375.
U.S. Office Action dated Mar. 22, 2018 in U.S. Appl. No. 15/450,624.

* cited by examiner

DETECTING BODY LANGUAGE VIA BONE CONDUCTION

BACKGROUND

The concepts and technologies disclosed herein generally relate to context-based computing. More specifically, the concepts and technologies disclosed herein relate to detecting body language via bone conduction.

Context-based computing is used to analyze contextual information to interpret a situation in which a user is involved. The act of manually entering contextual information into a device may itself change a user's context, and therefore contextual information is typically captured by sensors. Some context-based computing systems exist that utilize heart rate sensors, respiration sensors, or device usage to interpret a user's context. Existing approaches, however, fail to capture the rich information expressed by individuals through body language.

Body language is able to accurately convey a range of physical, emotional, and mental context of human beings as well as animals. Body language is capable of conveying emotions more accurately than facial expressions. This is due in part because humans often feel that facial expressions are indicative of their true feelings, and so can choose to express facial expressions that they believe convey the feeling that they want to convey rather than the feeling they actually feel—which is actually more accurately conveyed through their body language.

SUMMARY

Concepts and technologies disclosed herein are directed to detecting body language via bone conduction. According to one aspect disclosed herein, a device can detect body language of a user. The device can generate a signal and send the signal to a sensor network connected to a user. The device can receive a modified signal from the sensor network and compare the modified signal to a body language reference model. The device can determine the body language of the user based upon comparing the modified signal to the body language reference model.

In some embodiments, the sensor network includes a plurality of vibration sensors. The signal is sent to the sensor network. The signal is then propagated through a bone of the user by at least a portion of the plurality of vibration sensors. Propagation of the signal through the bone of the user causes the signal to be modified. The device then receives the modified signal as described above and as described in further detail herein.

In some embodiments, the device outputs information associated with the body language of the user to a context-aware application. The context-aware application may be executed by a processor of the device or may be executed by a processor external to the device, such as a server with which the device is in communication via a network.

In some embodiments, the device receives body language information associated with the body language of the user, analyzes the body language information to determine a physical activity being performed by the user, and selects an advertisement appropriate for the physical activity being performed by the user. The device can then provide the advertisement to the user.

In some embodiments, the device receives body language information associated with the body language of the user, analyzes the body language information to determine a mental state of the user, and selects an advertisement appropriate for the mental state of the user. The device can then provide the advertisement to the user.

In some embodiments, the device receives body language information associated with the body language of the user, analyzes the body language information to determine an emotional state of the user, and selects an advertisement appropriate for the emotional state of the user. The device can then provide the advertisement to the user.

In some embodiments, the device receives information associated with a physical attribute of the user, creates a body language profile based upon the information associated with the physical attribute of the user, and causing the body language profile to be stored. In these embodiments the body language model may be selected based, at least in part, upon the body language profile.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
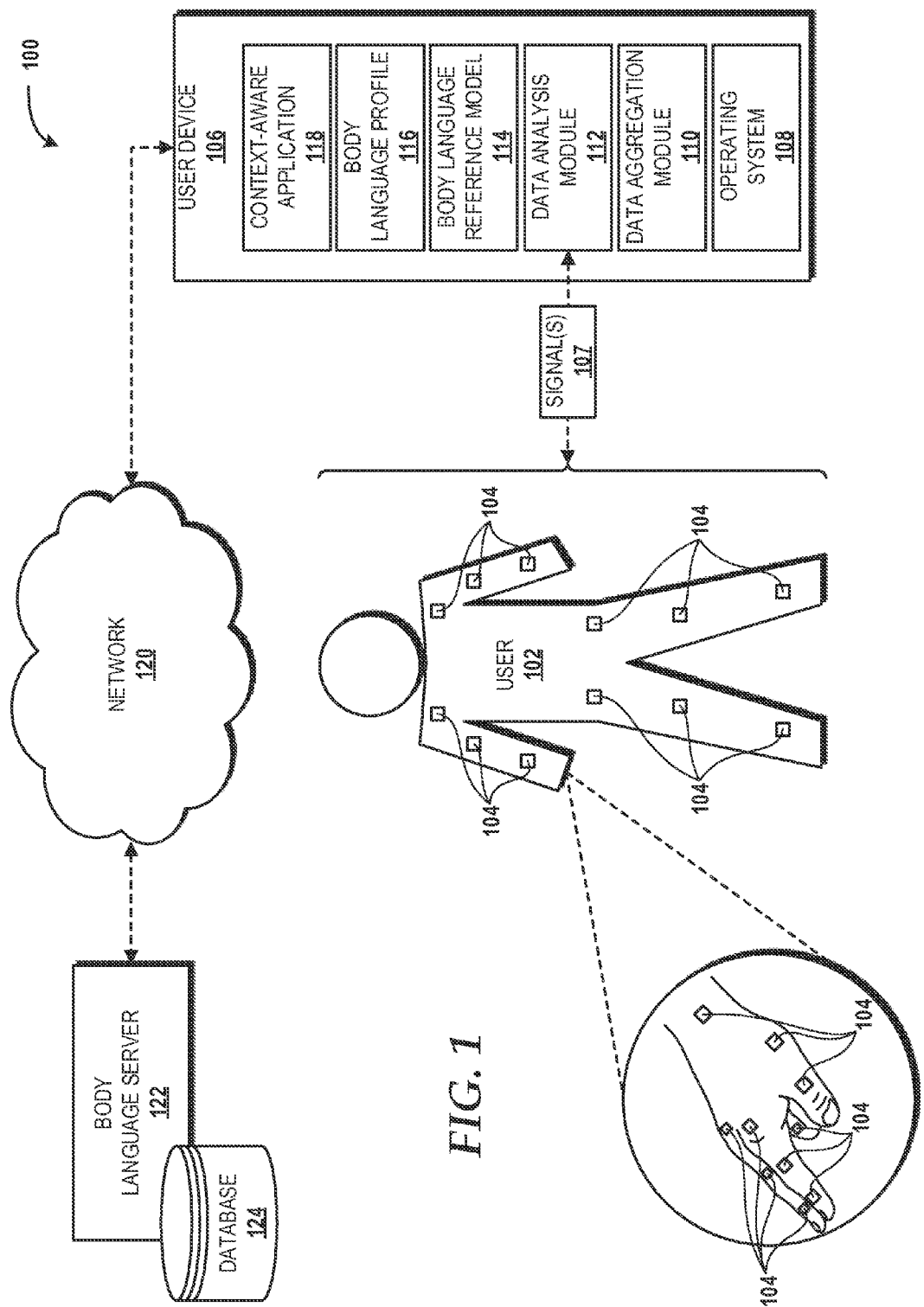
FIG. 1 is a block diagram illustrating aspects of an illustrative operating environment for various concepts disclosed herein.

The following detailed description is directed to detecting body language via bone conduction. According to one aspect disclosed herein, a device can detect body language of a user. The device can generate a signal and send the signal to a sensor network connected to a user. The device can receive a modified signal from the sensor network and compare the modified signal to a body language reference model. The device can determine the body language of the user based upon comparing the modified signal to the body language reference model.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of detecting body language via bone conduction will be presented.

Referring now to FIG. 1, aspects of an operating environment 100 in which various embodiments presented herein may be implemented will be described. The operating environment 100 shown in FIG. 1 includes a user 102, a plurality of sensors 104, and a user device 106 associated with the user 102. The plurality of sensors 104 may form a sensor network disposed at various locations on the user's 102 body. In the illustrated example, the plurality of sensors 104 are shown on the user's 102 arms, waist, legs, and one of the user's 102 hands. It should be understood, however, that one or more of the plurality of sensors 104 may positioned on or within any part of the user's 102 body, including the head, neck, and other areas not specifically illustrated in FIG. 1. Accordingly, the illustrated example should not be construed as being limiting in any way. In some implementations, one or more of the plurality of sensors 104 are implanted within the user's 102 body, and may be in direct contact with one or more bones of the user 102.

The plurality of sensors 104 can receive one or more signals 107 from the user device 106, transmit the signal(s) 107 throughout the user's 102 body, and return the signal(s) 107 as modified by the user's 102 body to the user device 106, which can analyze the signal(s) 107 to determine a position of the user's 102 body and/or portions thereof, such as, for example, the position of the user's 102 arms, legs, and/or hands. The position of the user's 102 body and/or portions thereof is indicative of body language being knowingly or unknowingly expressed by the user 102. The body language can be leveraged by the user device 106 to determine a physical, mental, and/or emotional state of the user 102. This state information can be utilized in various use cases, such as, for example, in targeted advertising and advertisement feedback use cases as described herein below with reference to various methods illustrated in FIGS. 5-8.

As used herein, a user's physical state can include the position of a user's arms, legs, hands, and/or other body parts. The user's physical state can include the user's posture, static body position, and/or body movement. Body movement may be indicative of a physical activity being performed by the user—such as walking, running, bicycling, rowing, or the like.

As used herein, a user's mental state can include a user's attitude or state of mind. For example, a user's mental state may indicate a user's aggression, attentiveness, boredom, relaxation, pleasure, amusement, intoxication, or the like. A user's mental state can include personality traits as expressed through his or her body language. The user's personality traits may or may not be indicative of a personality disorder that dictates some or all of his or her body language. In some embodiments, knowledge of a user with a given personality disorder may be used in a determination, such as targeted advertising or advertisement feedback, based upon body language.

As used herein, a user's emotional state can include a user's emotion expressed by his or her body language. Some examples of emotions that may be captured using the body language detection techniques described herein include, but are not limited to, anger, fear, anxiety, nervousness, sadness, embarrassment, surprise, and happiness. Anger may be expressed by a user clenching his or her fists; a user widening his or her stance to ensure stability for an impending attack; and/or the use of other aggressive or power body language as known to those skilled in the art. Fear, anxiety and nervousness may be expressed by a user exhibiting defensive body language, such as, for example, crossed arms and legs and generally drawing in of one or more limbs, or by a user exhibiting ready body language as part of a fight-or-flight response. Sadness may be expressed by a user drooping his or her body. Embarrassment may be expressed by a user looking down or away from others. Surprise may be expressed by a user suddenly moving backward. Happiness may be expressed by a user exhibiting open body language, such as, for example, open arms, open legs, and/or other body language indicative of openness.

The plurality of sensors 104, in some embodiments, are vibrations sensors that vibrate in accordance with one or more signals to send vibrations through one or more bones of the user's 102 body in accordance with a bone conduction technique. The vibration sensors may be piezoelectric transducers, such as contact microphones or other electro-acoustic transducers.

A signal that traverses at least a portion of the user's 102 body may have amplitude, frequency, and/or phase characteristics that are designed or "tuned" to the user's 102 body attributes. For example, a user's height, weight, body fat percentage, body muscle percentage, and/or bone characteristics such as bone density and bone mass, as well as the placement of the plurality of sensors 104 on or within the user's 102 body, can affect the vibrations transmitted by and/or received from individual sensors of the plurality of sensors 104, and so the signals sent through the user's 102 body can be generated taking into account the user's 102 body attributes. The user's 102 body attributes may be used to create a body language profile as will be described in greater detail below with reference to FIG. 2.

It should be understood that the use of bone conduction techniques eliminates certain environmental drawbacks of other techniques that utilize electrical signals. Indeed, the use of vibration sensors inherently relies on acoustic signals that are unaffected by environmental characteristics, such as, for example, temperature and humidity. Although bone conduction techniques are described herein as the primary techniques by which signals are transmitted throughout the user's 102 body, other techniques such as skin conduction may be utilized to enhance or fine tune body language information derived from signals received by the user device 106 after traversing the user's 102 body.

The user device 106 may be provided by one or more smartphones, feature phones, personal digital assistants ("PDAs"), tablet devices, laptop computers, desktop computers, server computers, video game systems, handheld video game systems, media players, set-top boxes, vehicle computing systems, smart watches, a personal tracker or safety device, other computing systems, other computing devices, combinations thereof, or the like. It should be understood that the functionality of the user device 106 can be provided by a single device, by two or more similar devices, and/or by two or more dissimilar devices. For purposes of describing the concepts and technologies disclosed herein, the user device 106 is described as a mobile telephone, such as a smartphone. It should be understood that this embodiment is illustrative, and should not be construed as being limiting in any way.

The illustrated user device 106 includes an operating system 108, a data aggregation module 110, a data analysis module 112, a body language reference model 114, a body language profile 116, and a context-aware application 118. The user device 106 can execute the operating system 108, the data aggregation module 110, the data analysis module 112, and the context-aware application 118. The operating system 108 is a program for controlling the operation of the user device 106. The data aggregation module 110, the data analysis module 112, and the context-aware application 118 include computer-executable instructions that are configured to execute on top of the operating system 108 to provide various functions described herein. In some embodiments, all or at least a portion of the instructions included in the data aggregation module 110, the data analysis module 112, and/or the context-aware application 118 are encoded in the operating system 108.

The data aggregation module 110 can be executed by one or more processors (not illustrated in FIG. 1, but illustrated and described below with reference to FIG. 9) of the user device 106 to perform various operations described herein for generating one or more signals 107, transmitting the signal(s) 107 to the user's 102 body, where the signal(s) 107 propagate through the user's 102 body from one sensor 104 to another within the sensor network provided by the plurality of sensors 104, and aggregating data associated with the signal(s) 107 received from one or more of the plurality of sensors 104. The data aggregation module 110 also provides the aggregated data to the data analysis module 112.

The data analysis module 112 can be executed by one or more processors (not illustrated in FIG. 1, but illustrated and described below with reference to FIG. 9) in determining a position of the user's 102 body and/or portions thereof, such as, for example, the position of the user's 102 arm, leg, or hand. The position of the user's 102 body and/or portions thereof is indicative of body language being knowingly or unknowingly expressed by the user 102. The body language can be leveraged by the data analysis module 112 to determine a physical, mental, and/or emotional state of the user 102. This state information can be utilized in various use cases, such as, for example, in targeted advertising and advertisement feedback use cases as described herein below with reference to various methods illustrated in FIGS. 5-8.

The physical, mental, and/or emotional state of the user 102 as demonstrated by the user's 102 body language can be determined based upon a comparison of the aggregated data received from the data aggregation module 110 to the body language reference model 114. The body language reference model 114 may include information related to body posture, gestures, facial expressions, eye movements, and other physical behaviors of the user 102 that are indicative of different physical, mental, and/or emotional states of the user 102. In some embodiments, the body language reference model 114 is created based, at least in part, upon body language research, and may be modified over time to incorporate new research findings in body language research.

The data analysis module 112 can determine a physical, mental, and/or emotional state of the user 102 based upon a comparison of the aggregated data received from the data aggregation module 110 to the body language reference model 114 and supplemental information provided by the body language profile 116 of the user 102. The body language profile 116 can identify one or more attributes of the user 102, including, but not limited to, weight, height, age, length of legs, length of arms, waist size, other dimensions of the user's 102 body or portions thereof, and the like. The body language profile 116 can also include anomalies with the user's 102 body language. By way of example, and not limitation, the user 102 may have a physical or other impairment that causes the user 102 to perform a physical behavior that is indicative of body language another user may use to convey their happiness, but because of the user's 102 physical or other impairment, this physical behavior is not indicative of the user's 102 happiness, and so may be flagged as such within the body language profile 116. During the comparison of the aggregated data to the body language reference model 114, the data analysis module 112 can disregard the aforementioned physical behavior for the user 102.

Although the data aggregation module 110 and the data analysis module 112 are illustrated as separate software modules that are executable by one or more processors of the user device 106, the data aggregation module 110 and the data analysis module 112, in some embodiments, are combined into a single module, or may be otherwise encoded within the operating system 108, the context-aware application 118, and/or one or more other applications (not shown). As such, the illustrated embodiment of the data aggregation module 110 and the data analysis module 112 as distinct components is but one example configuration, and should not be construed as limiting in any way.

The context-aware application 118 is configured to execute on top of the operating system 108 to provide features based, at least in part, upon the context of the user 102 as established based upon the user's 102 body language. In some embodiments, the context-aware application 118 is or includes an advertising application, an advertising plug-in, or other software component that is executable by one or more processors of the user device 106 to provide context-based advertising to the user 102 via the user device 106 based upon the body language of the user 102. In some embodiments, the context-aware application 118 provides advertising information to one or more other applications executing on the user device 106 or executing on one or more computing devices that are remote to the user device 106. Additional details regarding use of the context-aware application 118 for advertising purposes are described herein below with reference to FIGS. 5-8.

The user device 106 can operate in communication with and/or as part of a communications network ("network") 120. The network 120 is illustrated and described in greater detail herein below with reference to FIG. 11.

The user device 106 can communicate with a body language server 122 over the network 120. In some embodiments, the body language server 122 creates, at least in part, the body language reference model 114 and sends the body language reference model 114 to the user device 106. The body language server 122 may also update the body language reference model 114 from time to time based upon new body language research. The body language model 114 may be stored in a database 124 operating on or in communication with the body language server 122.

The body language server 122, in some embodiments, additionally or alternatively is used to store the body language profile 116 and user data associated with the user 102 as part of a user account for a body language service provided, at least in part, by the body language server 122. It is contemplated that one or more application programming interfaces ("APIs) can be created to take advantage of functionality provided by the body language service provided by the body language server 122. In some embodiments, an API is called by the context-aware application 118 and/or the data analysis module 112 to access the body language profile 116 and/or the body language reference model 114 from the body language server 122. In these embodiments, the body language profile 116 and/or the body language reference model 114 do not need to be stored locally on the user device 106, although the body language profile 116 and/or the body language reference model 114 may be at least partially cached at the user device 106 for faster access by the context aware application 118 and/or the data analysis module 112.

In some embodiments, the body language reference model 114 is created through the use of signal analysis and machine learning techniques. For example, an acoustic signal can be sent through an individual and captured via a sensor. The individual may be the user 102 or a test individual used to generate a baseline model, which can then be modified for the user 102 based upon information obtained from the body language profile 116. The raw signal obtained by the sensor can be analyzed and one or more features related to body language can be extracted based upon analysis techniques, including, for example, wavelet analysis, cepstral analysis, and sliding window analysis for relative power and root mean square amplitude. The extracted features can then be used to train the body language reference model 114 using machine learning-based classification. In some implementations, one or more machine learning algorithms are utilized to generate acceptable signal classifiers for features extracted from test signals. It is contemplated that the machine-learning algorithms can be deployed on the user device 106 so that the body language reference model 114 can be modified over time based upon the body language profile 116 and other information related to the user's 102 body before, during, and after the user 102 expresses body language.

FIG. 1 illustrates one user 102, one user device 106, one operating system 108, one data aggregation module 110, one data analysis module 112, one body language reference model 114, one body language profile 116, one context-aware application 118, one network 120, one body language server 122, and one database 124. It should be understood, however, that various implementations of the operating environment 100 include multiple users 102, multiple user devices 106, multiple operating systems 108, multiple data aggregation modules 110, multiple data analysis modules 112, multiple body language reference models 114, multiple body language profiles 116, multiple context-aware applications 118, multiple networks 120, multiple body language servers 122, and/or multiple databases 124. As such, the illustrated embodiment should be understood as being illustrative, and should not be construed as being limiting in any way.

Figure 2:
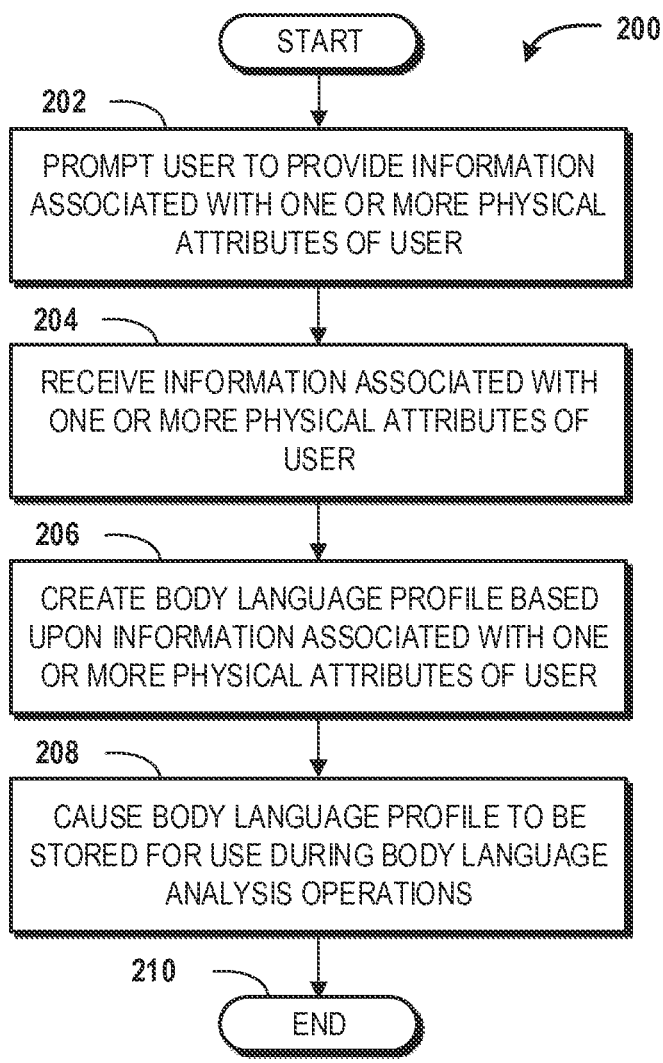
FIG. 2 is a flow diagram illustrating aspects of a method for creating a body language profile, according to an illustrative embodiment.

Turning now to FIG. 2, aspects of a method 200 for creating a body language profile, such as the body language profile 116, will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the user device 106, the body language server 122, single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the user device 106 and/or the body language server 122 to perform one or more operations and/or causing the processor to direct other components of the computing system or device to perform one or more of the operations.

For purposes of illustrating and describing some of the concepts of the present disclosure, the methods disclosed herein are described as being performed, at least in part, by the user device 106, via execution of one or more software modules and/or software applications, such as the data aggregation module 110, the data analysis module 112, and/or the context-aware application 118. It should be understood that additional and/or alternative devices and/or network nodes, such as the body language server 122, can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the user device 106 prompts the user 102 to provide information associated with one or more physical attributes of the user 102. The physical attributes can include, but are not limited to, the user's weight, height, age, length of legs, length of arms, waist size, other dimensions of the user's 102 body or portions thereof, combinations thereof, or the like. The user device 106 may prompt the user 102 to provide information associated with one or more physical attributes of the user 102 via a visual prompt on a display of the user device 106, via an audio prompt through a speaker of the user device 106, or a combination thereof. The user device 106 may prompt the user 102 to provide information associated with one or more physical attributes of the user 102 as part of an initial setup process conducted by the context-aware application 118 and/or the data analysis module 112. In embodiments in which the data analysis module 112 is encoded within the operating system 108, the initial setup process may be carried out through a settings menu of the operating system 108.

From operation 202, the method 200 proceeds to operation 204, where the user device 106 receives the information associated with one or more physical attributes of the user 102. The user device 106 may receive the information associated with one or more physical attributes of the user 102 via manual entry via a touchscreen, a keypad, a microphone, or other input component of the user device 106. Alternatively, the user device 106 may receive the information associated with one or more physical attributes of the user 102 from a user account associated with the user 102 and stored within the database 124 of the body language server 122.

From operation 204, the method 200 proceeds to operation 206, where the user device 106 creates the body language profile 116 based upon the information associated with one or more physical attributes of the user 102. The body language profile 116 can also include anomalies with the user's 102 body language. By way of example, and not limitation, the user 102 may have a physical or other impairment that causes the user 102 to perform a physical behavior that is indicative of body language another user may use to convey their happiness, but because of the user's 102 physical or other impairment, this physical behavior is not indicative of the user's 102 happiness, and so may be flagged as such within the body language profile 116.

From operation 206, the method 200 proceeds to operation 208, where the user device 106 causes the body language profile 116 to be stored for use during one or more body language analysis operations, such as described herein below. The user device 106 may cause the body language profile 116 to be stored locally in a storage component of the user device 106 and/or may cause the body language profile 116 to be stored in the database 124 of the body language server 122.

From operation 208, the method 200 proceeds to operation 210. The method 200 ends at operation 210.

Figure 3:
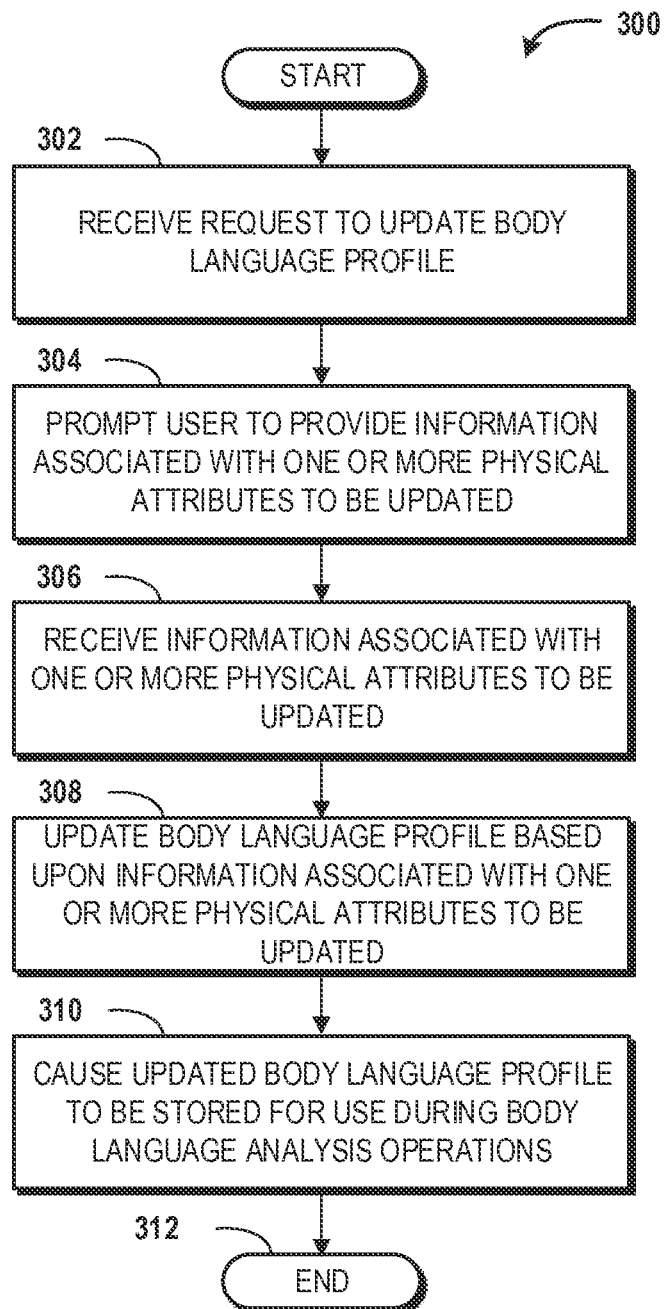
FIG. 3 is a flow diagram illustrating aspects of a method for updating a body language profile, according to an illustrative embodiment.

Turning now to FIG. 3, a method 300 for updating a body language profile, such as the body language profile 116, will be described in detail, according to an illustrative embodiment. The method 300 will be described with reference to FIG. 3 and FIG. 1.

The method 300 begins and proceeds to operation 302, where the user device 106 receives a request to update the body language profile 116. The request may be received from the user 102, from an application, such as the context-aware application 118, executing on the user device 106, or from an external source. The external source may be a remote application, such as an application executing on the body language server 122. The external source may be a device that is in communication with the user device 106 via the network 120 and/or via a local network, such as a BLUETOOTH, ZIGBEE, WI-FI, or other local or personal area network. The device may be, for example, a smart scale that is configured to weigh the user 102 and send the user's 102 weight to the user device 106. The smart scale may format the weight as a request to update the body language profile 116 for the user 102, or the smart scale may merely send the weight to the user device 106 based upon a configuration setting, and the user device 106 may interpret this as a request to update the body language profile 116.

From operation 302, the method 300 proceeds to operation 304, where the user device 106 prompts the user 102 to provide information associated with one or more physical attributes of the user 102. Operation 304 is performed in response to the user 102 requesting to update the body language profile 116 or an application requesting that the user 102 update the body language profile 116. For embodiments in which the request is received from an external source, the operation 304 is not performed, although it is contemplated that the user 102 may modify information provided by the external source.

From operation 304, the method 300 proceeds to operation 306, where the user device 106 receives the information associated with one or more physical attributes of the user 102 to be updated. The user device 106 may receive the information associated with one or more physical attributes of the user 102 to be updated via manual entry via a touchscreen, a keypad, a microphone, or other input component of the user device 106. Alternatively, the user device 106 may receive the information associated with one or more physical attributes of the user 102 to be updated from a user account associated with the user 102 and stored within the database 124 of the body language server 122.

From operation 306, the method 300 proceeds to operation 308, where the user device 106 updates the body language profile 116 based upon the information associated with one or more physical attributes of the user 102 to be updated. The body language profile 116 can also include anomalies with the user's 102 body language. By way of example, and not limitation, the user 102 may have a physical or other impairment that causes the user 102 to perform a physical behavior that is indicative of body language another user may use to convey their happiness, but because of the user's 102 physical or other impairment (e.g., a personality disorder), this physical behavior is not indicative of the user's 102 happiness, and so may be flagged as such within the body language profile 116.

From operation 308, the method 300 proceeds to operation 310, where the user device 106 causes the body language profile 116 as updated to be stored for use during one or more body language analysis operations, such as described herein below. The user device 106 may cause the body language profile 116 as updated to be stored locally in a storage component the user device 106 and/or may cause the body language profile 116 as updated to be stored in the database 124 of the body language server 122.

From operation 310, the method 300 proceeds to operation 312. The method 300 ends at operation 312.

Figure 4:
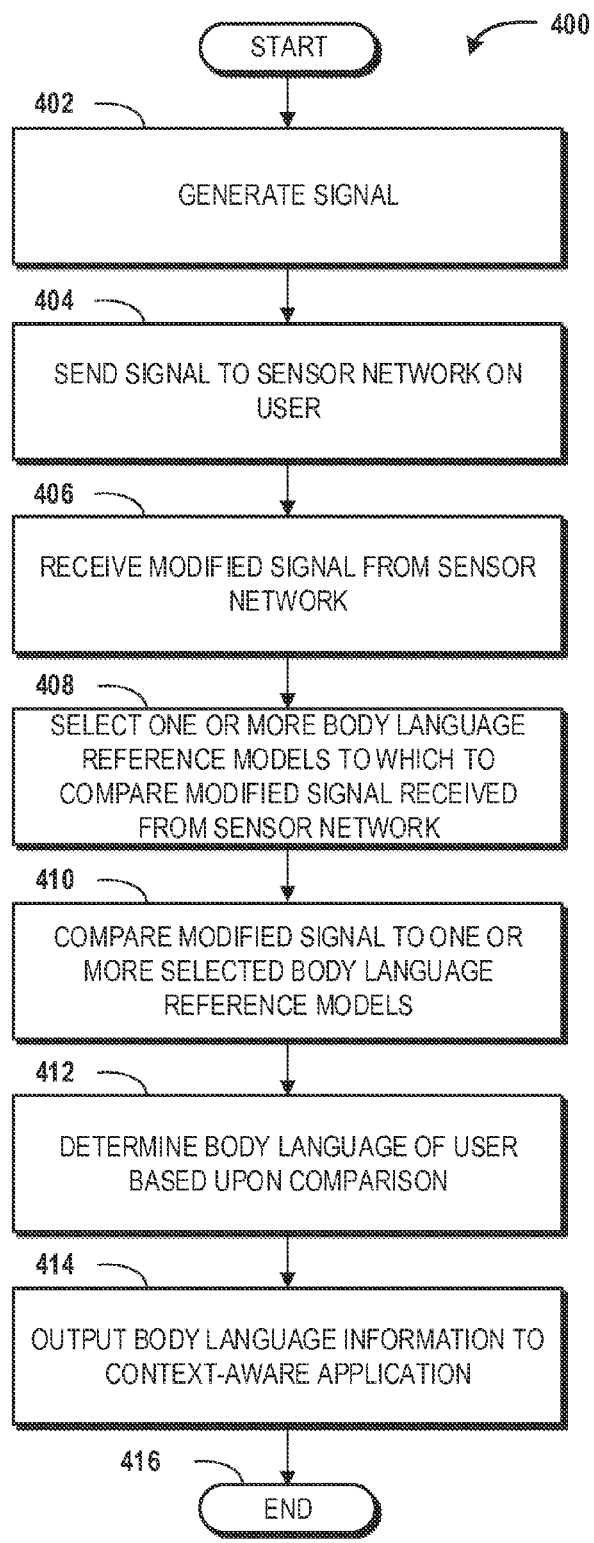
FIG. 4 is a flow diagram illustrating aspects of a method for determining the body language of a user, according to an illustrative embodiment.

Turning now to FIG. 4, a method 400 for determining the body language of a user, such as the user 102, will be described in detail, according to an illustrative embodiment. The method 400 will be described with reference to FIG. 4 and FIG. 1.

The method 400 begins and proceeds to operation 402, where the user device 106, and more particularly the data aggregation module 110, generates a signal, such as the signal 107. The signal 107 may be generated based upon the body language profile 116 and considering information associated with one or more the physical attributes of the user 102 as obtained during the initial setup process described above with reference to the method 200 illustrated in FIG. 2 or the update process described above with reference to the method 300 illustrated in FIG. 3. In general, the signal 107 is generated with amplitude, frequency, and/or phase characteristics conducive for transfer through the user's 102 body based upon information stored in the body language profile 116. If a body language profile is not available for the user 102, a default signal may be generated. In some implementations, even without a body language, the user device 106 may prompt the user 102 to input height, weight, and/or other physical attributes to further tune the signal to the user 102.

From operation 402, the method 400 proceeds to operation 404, where the user device 106, and more particularly the data aggregation module 110, sends the signal 107 to the sensor network formed by the plurality of sensors 104 placed on or within the user's 102 body. From operation 404, the method 400 proceeds to operation 406, where the user device 106, and more particularly the data aggregation module 110, receives the signal 107 as modified by the user's 102 body from the sensor network.

From operation 406, the method 400 proceeds to operation 408, where the user device 106, and more particularly the data analysis module 112, selects one or more body language reference models, such as the body language reference model 114, to use to compare the signal 107 received from the sensor network. From operation 408, the method 400 proceeds to operation 410, where the user device 106, and more particularly the data analysis module 112, compares signal 107 as modified by the user's 102 body to the selected body language reference model(s).

From operation 410, the method 400 proceeds to operation 412, where the user device 106, and more particularly the data analysis module 112, determines the body language of the user 102 based upon the comparison. For example, based upon the propagation time for the signal 107 to reach the user's 102 body and return, the attenuation of the signal 107, and/or other characteristics of the signal 107 that are changed, the position of the user's 102 body or one or more portions thereof can be determined. The position of the user's 102 body or one or more portions thereof can be compared to data contained within the selected body language reference model(s) to determine a closest match for the body language being expressed by the user 102.

From operation 412, the method 400 proceeds to operation 414, where the user device 106 outputs information associated with the body language of the user 102 as determined at operation 412 to the context-aware application 118. The context-aware application 118 receives the information associated with the body language of the user 102 and performs one or more operations based upon the information associated with the body language of the user 102. Some examples of operations that may be performed by the context-aware application 118 are described herein below with reference to FIGS. 5-8.

From operation 414, the method 400 proceeds to operation 416. The method 400 ends at operation 416

Figure 5:
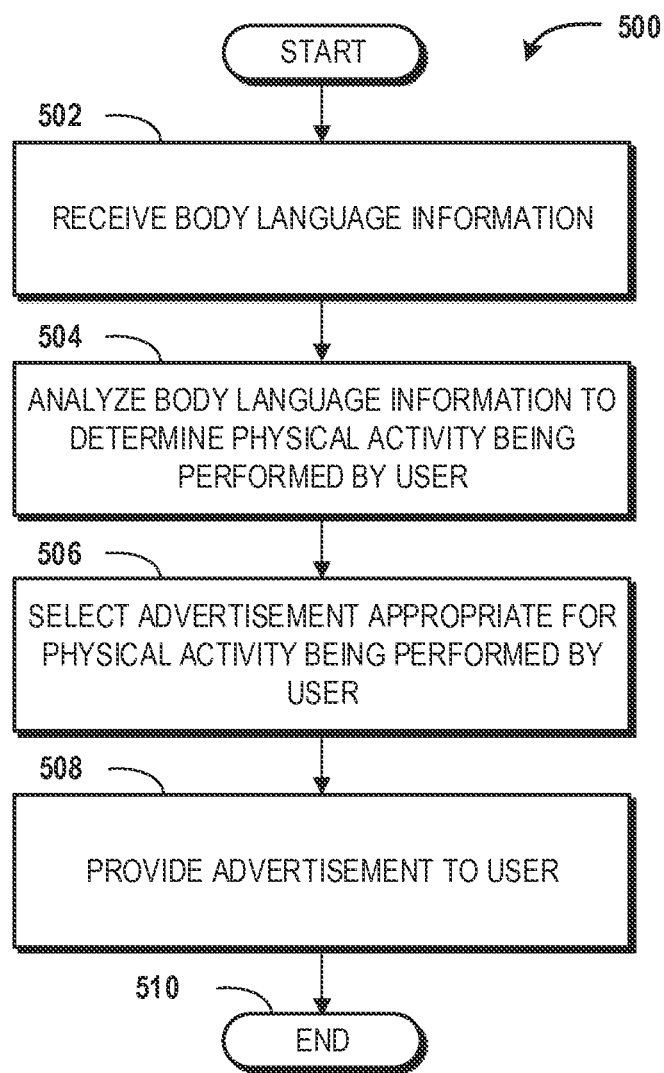
FIG. 5 is a flow diagram illustrating aspects of a method for targeted advertising based upon a physical activity of a user, according to an illustrative embodiment.

Turning now to FIG. 5, a method 500 for targeted advertising based upon a physical activity of a user, will be described in detail, according to an illustrative embodiment. The method 500 will be described with reference to FIG. 5 and FIG. 1.

The method 500 begins and proceeds to operation 502, where the context-aware application 118 receives body language information from the data analysis module 112. From operation 502, the method 500 proceeds to operation 504, where the context-aware application 118 analyzes the body language information to determine a physical activity being performed by the user 102. For example, if a user is walking, running, biking, or performing some other physical activity, the body language information may be indicative of movements performed by the user 102 during such activities. Moreover, other sensors of the user device 106 or in communication with the user 106 may be utilized to enhance the determination at operation 504. For example, an accelerometer may be used to estimate a speed the user 102 is walking or running, or a heart rate monitor may be used to determine the intensity of the physical activity.

From operation 504, the method 500 proceeds to operation 506, where the context-aware application 118 selects an advertisement that is appropriate for the physical activity being performed by the user 102. For example, if the user 102 is determined to be running, the context-aware application 118 may select an advertisement for running shoes, a running accessory, a running magazine, or some other product or service associated with running and/or a related activity, such as walking.

From operation 506, the method 500 proceeds to operation 508, where the context-aware application 118 provides the selected advertisement to the user 102. In some embodiments, the context-aware application 118 provides the selected advertisement to the user 102 via a display of the user device 106, via audio output through a speaker of the user device 106, or a combination thereof. In some other embodiments, the context-aware application 118 provides the selected advertisement to another application executing on the user device 106. For example, the context-aware application 118 may provide the selected advertisement to a web browser executing on the user device 106. The web browser may present the selected advertisement in addition to or as an alternative to other advertising presented by the web browser. In some other embodiments, the context-aware application 118 provides the selected advertisement as a notification via a notification system of the operating system 108 of the user device 106. Other methods by which the context-aware application 118 may provide the selected advertisement to the user 102 include, but are not limited to, email, short message service ("SMS") message, Internet protocol ("IP")-based text messaging service message, social networking service message, social networking activity feed, physical mail, radio broadcast, push notification, a combination thereof, and the like.

From operation 508, the method 500 proceeds to operation 510. The method 500 ends at operation 510.

Figure 6:
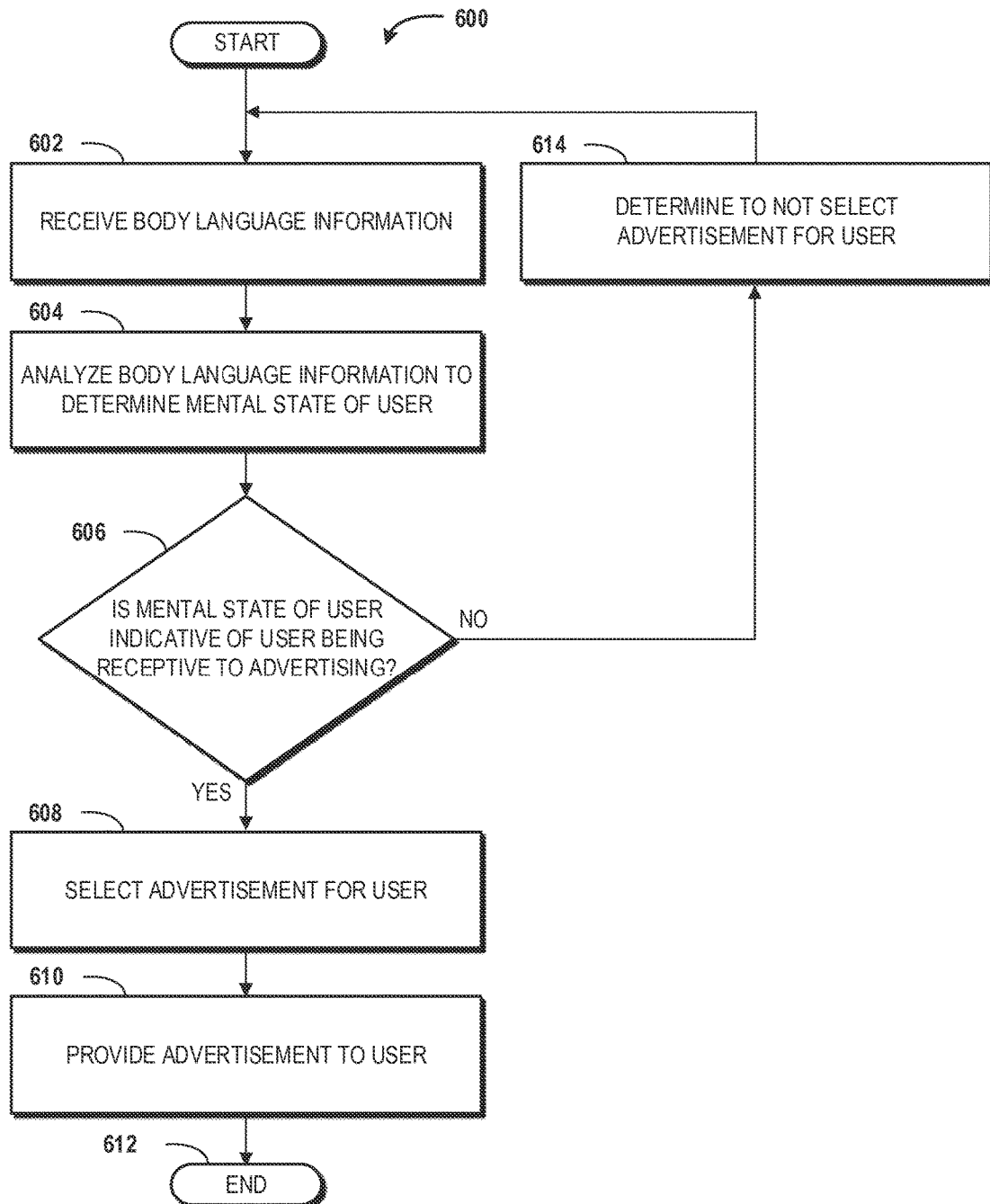
FIG. 6 is a flow diagram illustrating aspects of a method for targeted advertising based upon a mental state of a user, according to an illustrative embodiment.

Turning now to FIG. 6, a method 600 for targeted advertising based upon a mental state of a user will be described, according to an illustrative embodiment. The method 600 will be described with reference to FIG. 6 and FIG. 1.

The method 600 begins and proceeds to operation 602, where the context-aware application 118 receives body language information from the data analysis module 112. From operation 602, the method 600 proceeds to operation 604, where the context-aware application 118 analyzes the body language information to determine a mental state of the user 102. A user's mental state can include a user's attitude or state of mind. For example, a user's mental state may indicate a user's aggression, attentiveness, boredom, relaxation, pleasure, amusement, intoxication, or the like. A user's mental state can include personality traits as expressed through his or her body language. The user's personality traits may or may not be indicative of a personality disorder that dictates some or all of his or her body language.

From operation 604, the method 600 proceeds to operation 606, where the context-aware application 118 determines whether the mental state of the user 102 is indicative of the user being receptive to advertising. For example, a user that exhibits attentiveness to an advertisement may be indicative of a user that is receptive to advertising, whereas a user that exhibits aggression or boredom may be indicative of a user that is not receptive to advertising.

If the context-aware application 118 determines that the mental state of the user 102 is indicative of the user 102 being receptive to advertising, the method 600 proceeds to operation 608. At operation 608, the context-aware application 118 selects an advertisement that is appropriate for the mental state of the user 102. From operation 608, the method 600 proceeds to operation 610, where the context-aware application 118 provides the selected advertisement to the user 102. In some embodiments, the context-aware application 118 provides the selected advertisement to the user 102 via a display of the user device 106, via audio output through a speaker of the user device 106, or a combination thereof. In some other embodiments, the context-aware application 118 provides the selected advertisement to another application executing on the user device 106. For example, the context-aware application 118 may provide the selected advertisement to a web browser executing on the user device 106. The web browser may present the selected advertisement in addition to or as an alternative to other advertising presented by the web browser. In some other embodiments, the context-aware application 118 provides the selected advertisement as a notification via a notification system of the operating system 108 of the user device 106. Other methods by which the context-aware application 118 may provide the selected advertisement to the user 102 include, but are not limited to, email, SMS message, IP-based text messaging service message, social networking service message, social networking activity feed, physical mail, radio broadcast, push notification, a combination thereof, and the like.

From operation 610, the method 600 proceeds to operation 612. The method 600 ends at operation 612.

If, at operation 606, the context-aware application 118 determines that the mental state of the user 102 is not indicative of the user 102 being receptive to advertising, the method 600 proceeds to operation 614. At operation 614, the context-aware application 118 determines not to select an advertisement for the user 102. The method 600 then proceeds back to operation 602.

Figure 7:
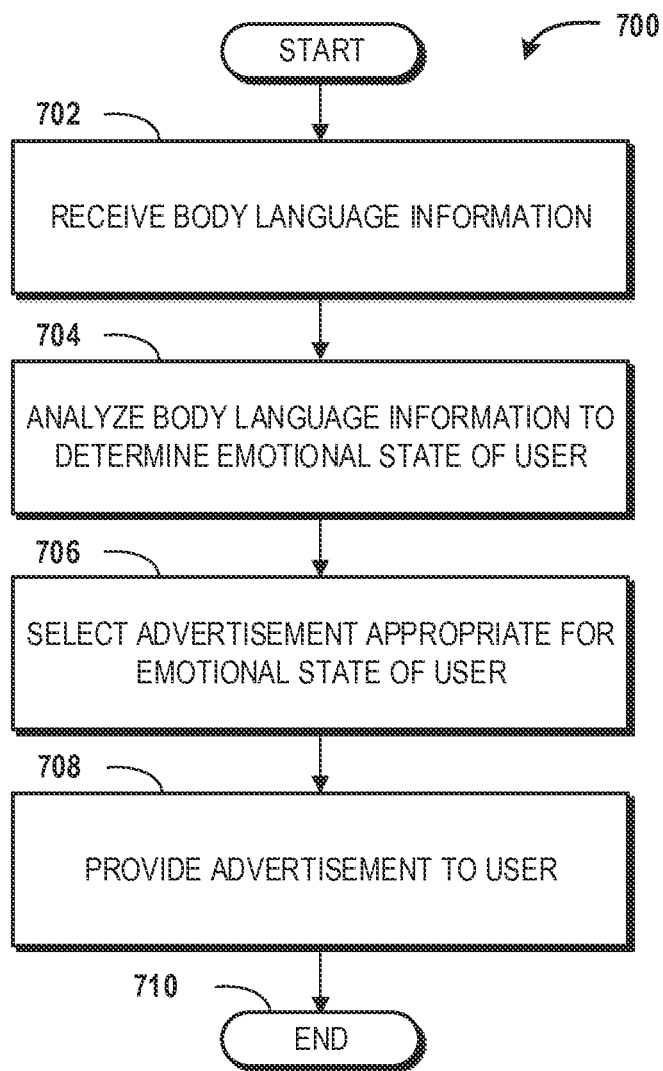
FIG. 7 is a flow diagram illustrating aspects of a method for targeting advertising based upon an emotional state of a user, according to an illustrative embodiment.

Turning now to FIG. 7, a method 700 for targeting advertising based upon an emotional state of a user will be described, according to an illustrative embodiment. The method 700 will be described with reference to FIG. 7 and FIG. 1.

The method 700 begins and proceeds to operation 702, where the context-aware application 118 receives body language information from the data analysis module 112. From operation 702, the method 700 proceeds to operation 704, where the context-aware application 118 analyzes the body language information to determine an emotional state of the user 102. A user's emotional state can include a user's emotion expressed by his or her body language. Some examples of emotions that may be captured using the body language detection techniques described herein include, but are not limited to, anger, fear, anxiety, nervousness, sadness, embarrassment, surprise, and happiness. Anger may be expressed by a user clenching his or her fists; a user widening his or her stance to ensure stability for an impending attack; and/or the use of other aggressive or power body language as known to those skilled in the art. Fear, anxiety and nervousness may be expressed by a user exhibiting defensive body language, such as, for example, crossed arms and legs and generally drawing in of one or more limbs, or by a user exhibiting ready body language as part of a fight-or-flight response. Sadness may be expressed by a user drooping his or her body. Embarrassment may be expressed by a user looking down or away from others. Surprise may be expressed by a user suddenly moving backward. Happiness may be expressed by a user exhibiting open body language, such as, for example, open arms, open legs, and/or other body language indicative of openness.

From operation 704, the method 700 proceeds to operation 706, where the context-aware application 118 selects an advertisement that is appropriate for the emotional state of the user 102. For example, a user that exhibits anger or sadness may be indicative of a user that is not receptive to advertising, whereas a user that exhibits happiness may be indicative of a user that is receptive to advertising. In addition to the selection of an advertisement based upon a perceived receptiveness to advertising, the selection of an advertisement can be refined by the type of emotional state a user is in. If a user is determined to be happy, the context-aware application 118 may select an advertisement for a new product, service, or event, since a happy user may be more open and therefore more receptive to advertisements related to unfamiliar products, services, and/or experiences. If a user is determined to be sad, the context-aware application 118 may select an advertisement for food because the user may be more receptive to things that provide comfort at a basic human level.

From operation 706, the method 700 proceeds to operation 708, where the context-aware application 118 provides the selected advertisement to the user 102. In some embodiments, the context-aware application 118 provides the selected advertisement to the user 102 via a display of the user device 106, via audio output through a speaker of the user device 106, or a combination thereof. In some other embodiments, the context-aware application 118 provides the selected advertisement to another application executing on the user device 106. For example, the context-aware application 118 may provide the selected advertisement to a web browser executing on the user device 106. The web browser may present the selected advertisement in addition to or as an alternative to other advertising presented by the web browser. In some other embodiments, the context-aware application 118 provides the selected advertisement as a notification via a notification system of the operating system 108 of the user device 106. Other methods by which the context-aware application 118 may provide the selected advertisement to the user 102 include, but are not limited to, email, SMS message, IP-based text messaging service message, social networking service message, social networking activity feed, physical mail, radio broadcast, push notification, a combination thereof, and the like.

From operation 708, the method 700 proceeds to operation 710. The method 700 ends at operation 710.

Figure 8:
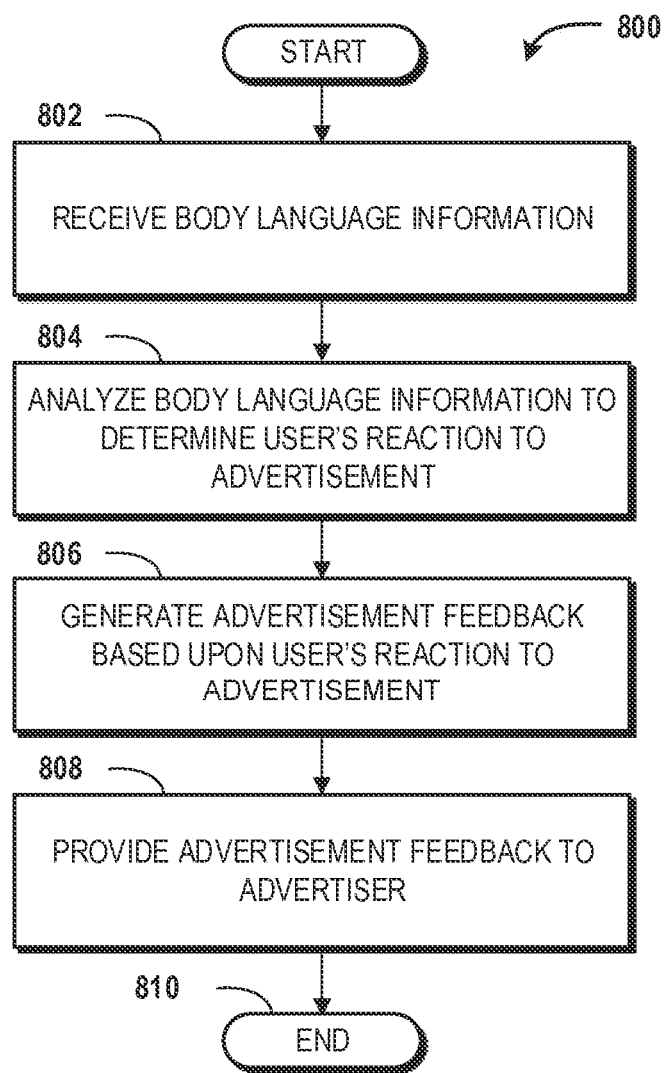
FIG. 8 is a flow diagram illustrating aspects of a method for providing advertisement feedback, according to an illustrative embodiment.

Turning now to FIG. 8, a method 800 for providing advertisement feedback will be described, according to an illustrative embodiment. The method 800 will be described with reference to FIG. 8 and FIG. 1.

The method 800 begins and proceeds to operation 802, where the context-aware application 118 receives body language information from the data analysis module 112. From operation 802, the method 800 proceeds to operation 804, where the context-aware application 118 analyzes the body language information to determine the user's 102 reaction to an advertisement. In some embodiments, the body language information received from the data analysis module 112 includes information related to body language expressed by the user 102 following the presentation of an advertisement. In some other embodiments, the body language information received from the data analysis module 112 includes information related to body language expressed by the user 102 before and after presentation of an advertisement. In some other embodiments, the body language information received from the data analysis module 112 includes information related to body language expressed by the user 102 before, during, and after presentation of an advertisement.

From operation 804, the method 800 proceeds to operation 806, where the context-aware application 118 generates advertisement feedback based upon the user's 102 reaction to the advertisement. For example, if the body language is indicative of a favorable reaction by the user 102 to the advertisement, the context-aware application 118 can generate positive feedback for the advertisement. If the body language is indicative of an unfavorable reaction by the user 102 to the advertisement, the context-aware application 118 can generate negative feedback for the advertisement.

From operation 806, the method 800 proceeds to operation 808, where the context-aware application 118 provides the advertisement feedback to an advertiser that provided the advertisement. The advertiser can then utilize the advertisement feedback to modify their advertisements, change demographics to which the advertisement is presented, change time of day the advertisement is presented, change advertisement medium, and/or otherwise modify the advertising campaign of the advertiser. It is contemplated that the advertiser may desire not to modify the advertisement based upon positive feedback.

In some embodiments, body language is monitored during presentation of an advertisement. If the user 102 exhibits a negative response to the advertisement, the advertisement may be paused or stopped. The advertisement may be paused or stopped after the user 102 exhibits a negative response for a pre-defined period of time. If after the period of time the user's 102 reaction to the advertisement does not improve, the advertisement may be paused or stopped.

In some embodiments, the accuracy of a determination regarding the user's 102 feedback to an advertisement can be enhanced by incorporating data from other sources, such as, for example, captured audio of a verbal complaint or interaction with the user device 106 by opening another application while the advertisement is playing, turning down the volume, lowering the screen brightness, locking or otherwise placing the user device 106 into a low power state in which a display of the user device 106 is dimmed or turned off, or by initiating a power down operation on the user device 106.

Figure 9:
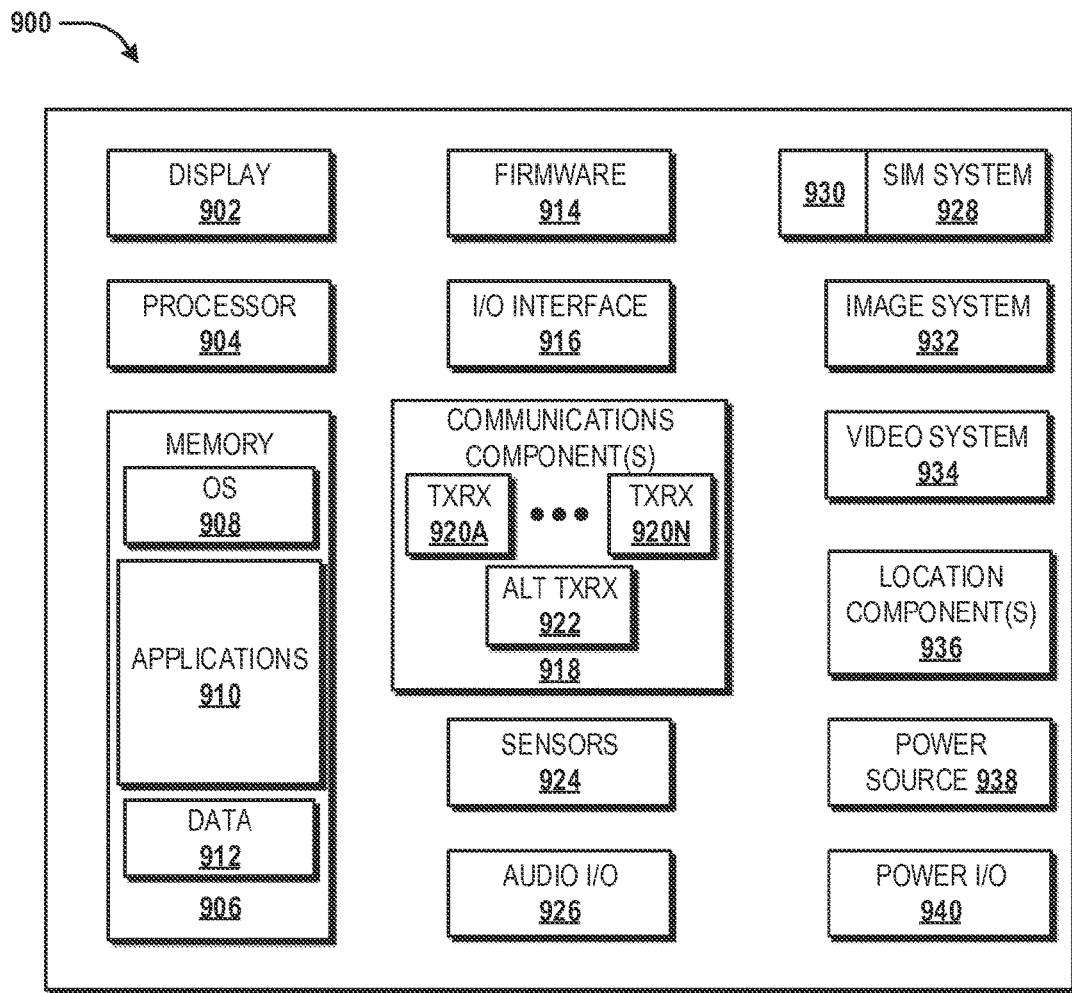
FIG. 9 is a block diagram illustrating an example mobile device capable of implementing aspects of the embodiments disclosed herein.

Turning now to FIG. 9, an illustrative mobile device 900 and components thereof will be described. In some embodiments, the user device 106 described above with reference to FIG. 1 can be configured as and/or can have an architecture similar or identical to the mobile device 900 described herein in FIG. 9. It should be understood, however, that the user device 106 may or may not include the functionality described herein with reference to FIG. 9. While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various graphical user interface ("GUI") elements, text, images, video, advertisements, body language profile settings, body language profile setup prompts, virtual keypads and/or keyboards, messaging data, notification messages, metadata, internet content, device status, time, date, calendar data, device preferences, map and location data, combinations thereof, and the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908 (e.g., the operating system 108), one or more applications 910 (e.g., the data aggregation module 110, the data analysis module 112, and the context-aware application 118), other computer-executable instructions stored in a memory 906, or the like. In some embodiments, the applications 910 also can include a UI application (not illustrated in FIG. 9).

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering content, viewing account information, answering/initiating calls, entering/deleting data, entering and setting user IDs and passwords for device access, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900. The data 912 can include, for example, the body language reference model 114, the body language profile 116, and/or other applications or program modules. According to various embodiments, the data 912 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, user information, organization information, presence status information, user IDs, passwords, and application initiation (start-up) requests. In some embodiments, the I/O interface 916 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as the network 122 described above herein. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using Global System for Mobile communication ("GSM"), Code Division Multiple Access ("CDMA"), CDMAONE, CDMA2000, Long-Term Evolution ("LTE"), and various other 2G, 2.5G, 3G, 4G, and greater generation technology standards. Moreover, the communications component 918 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 918 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, IRDA, NFC, other RF technologies, combinations thereof, and the like.

In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from GPS devices, A-GPS devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Figure 10:
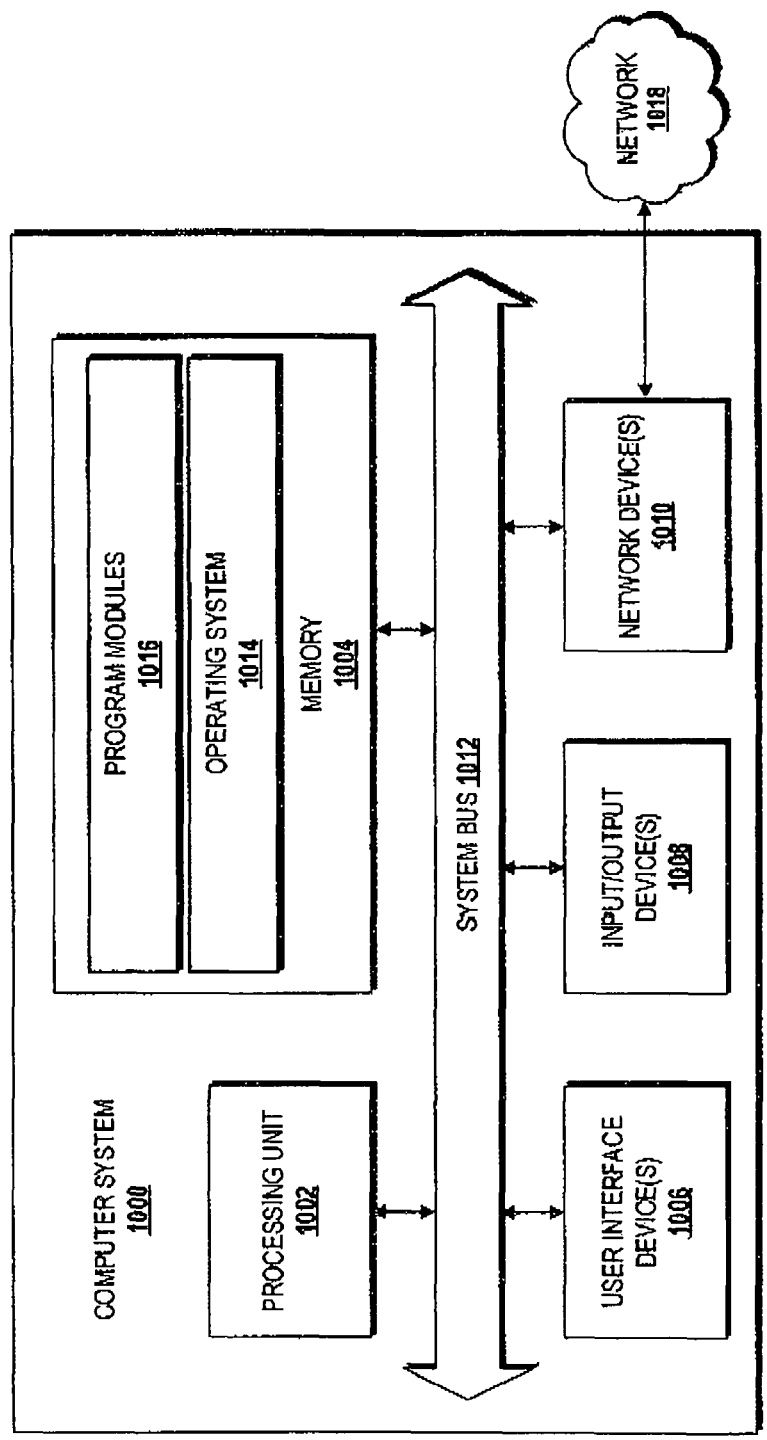
FIG. 10 is a block diagram illustrating an example computer system capable of implementing aspects of the embodiments presented herein.

FIG. 10 is a block diagram illustrating a computer system 1000 configured to provide the functionality in accordance with various embodiments of the concepts and technologies disclosed herein. In some implementations, the user device 106 and/or the body language server 122 utilize an architecture that is the same as or similar to the architecture of the computer system 1000. It should be understood, however, that modification to the architecture may be made to facilitate certain interactions among elements described herein.

The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1016 may include various software and/or program modules to perform the various operations described herein, such as those described with reference to one or more of the methods 200-800. The program modules 1016 and/or other programs can be embodied in computer-readable media containing instructions that, when executed by the processing unit 1002, perform one or more of the methods 200-800 or a portion thereof, described in detail above with respect to FIGS. 2-8. According to embodiments, the program modules 1016 may be embodied in hardware, software, firmware, or any combination thereof. Although not shown in FIG. 10, it should be understood that the memory 1004 also can be configured to store the user database 124 and/or other data, if desired.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer.

The network devices 1010 enable the computer system 1000 to communicate with other networks or remote systems via a network 1018. Examples of the network devices 1010 include, but are not limited to, the network 120, a modem, a radio frequency ("RF") or infrared ("IR") transceiver, a telephonic interface, a bridge, a router, or a network card. The network 1018 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1018 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 11:
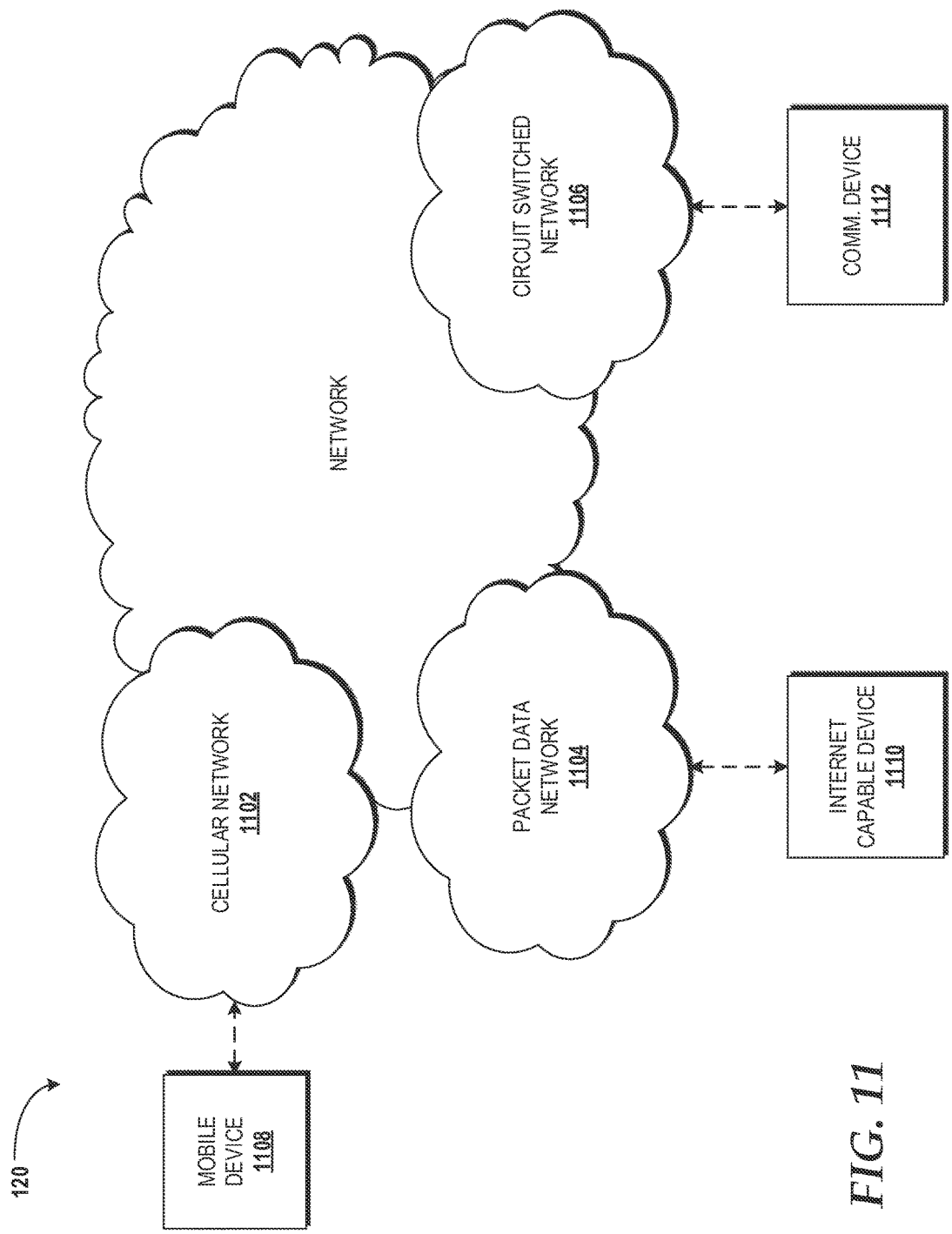
FIG. 11 schematically illustrates a network, according to an illustrative embodiment.

Turning now to FIG. 11, additional details of the network 120 are illustrated, according to an illustrative embodiment. The network 120 includes a cellular network 1102, a packet data network 1104, for example, the Internet, and a circuit switched network 1106, for example, a publicly switched telephone network ("PSTN"). The cellular network 1102 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1102 also includes radios and nodes for receiving and transmitting voice, data, and combinations thereof to and from radio transceivers, networks, the packet data network 1104, and the circuit switched network 1106.

A mobile communications device 1108, such as, for example, a cellular telephone, a user equipment, a mobile terminal, a PDA, a laptop computer, a handheld computer, the user device 106, and combinations thereof, can be operatively connected to the cellular network 1102. The cellular network 1102 can be configured as a 2G GSM network and can provide data communications via GPRS and/or EDGE. Additionally, or alternatively, the cellular network 1102 can be configured as a 3G UMTS network and can provide data communications via the HSPA protocol family, for example, HSDPA, EUL (also referred to as HSUPA), and HSPA+. The cellular network 1102 also is compatible with 4G mobile communications standards such as LTE, or the like, as well as evolved and future mobile standards.

The packet data network 1104 includes various devices, for example, servers, computers, databases, and other devices in communication with one another, as is generally known. The packet data network 1104 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1104 includes or is in communication with the Internet. The circuit switched network 1106 includes various hardware and software for providing circuit switched communications. The circuit switched network 1106 may include, or may be, what is often referred to as a plain old telephone system (POTS). The functionality of a circuit switched network 1106 or other circuit-switched network are generally known and will not be described herein in detail.

The illustrated cellular network 1102 is shown in communication with the packet data network 1104 and a circuit switched network 1106, though it should be appreciated that this is not necessarily the case. One or more Internet-capable devices 1110, for example, the user device 106, a PC, a laptop, a portable device, or another suitable device, can communicate with one or more cellular networks 1102, and devices connected thereto, through the packet data network 1104. It also should be appreciated that the Internet-capable device 1110 can communicate with the packet data network 1104 through the circuit switched network 1106, the cellular network 1102, and/or via other networks (not illustrated).

As illustrated, a communications device 1112, for example, a telephone, facsimile machine, modem, computer, the user device 106, or the like, can be in communication with the circuit switched network 1106, and therethrough to the packet data network 1104 and/or the cellular network 1102. It should be appreciated that the communications device 1112 can be an Internet-capable device, and can be substantially similar to the Internet-capable device 1110. In the specification, the network 120 is used to refer broadly to any combination of the networks 1102, 1104, 1106. It should be appreciated that substantially all of the functionality described with reference to the network 120 can be performed by the cellular network 1102, the packet data network 1104, and/or the circuit switched network 1106, alone or in combination with other networks, network elements, and the like.

According to various implementations of the concepts and technologies described herein, the user device 106 can use any combination of the devices disclosed herein including, but not limited to, the mobile device 1108, the Internet capable device 1110, and/or the communication device 1112 to access web pages or other resources; to access the body language server 122; to access the database 124; to transmit and/or receive the signals from 107 from the plurality of sensors 104; and/or for other interactions between the user device 106, the body language server 122, and/or the plurality of sensors 104. As such, it should be understood that the user device 106 can interact with the body language server 122 via any number and/or combination of devices and networks. It should be understood that these examples are illustrative and therefore should not be construed as being limiting in any way.

Based on the foregoing, it should be appreciated that concepts and technologies directed to detecting body language via bone conduction have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
    generating, by a device comprising a processor, a signal;
    sending, by the device, the signal to a sensor network associated with a user, wherein the sensor network comprises a plurality of vibration sensors positioned at various locations on a body of the user;
    receiving, at the device, a modified signal from the sensor network, wherein the modified signal comprises the signal received, from the device, by at least one vibration sensor of the plurality of vibration sensors and propagated by the at least one vibration sensor through at least one bone of the body of the user, thereby modifying the signal to create the modified signal;
    selecting, by the device, a body language reference model to compare to the modified signal received from the sensor network, wherein the body language reference model identifies a plurality of body language features and associated signal features;
    comparing, by the device, the modified signal to the body language reference model;
    determining, by the device, based upon comparing the modified signal to the body language reference model, a signal feature of the modified signal that maps to a body language feature of the plurality of body language features identified in the body language reference model; and
    outputting, by the device, the body language feature of the plurality of body language features identified in the body language reference model to an application.

2. The method of claim 1, wherein outputting, by the device, the body language feature to the application comprises outputting, by the device, the body language feature to a context-aware application.

3. The method of claim 2, further comprising:
    receiving, at the context-aware application being executed by the processor, body language information associated with the body language feature;
    analyzing, by the context-aware application, the body language information to determine a physical activity being performed by the user;
    selecting, by the context-aware application, an advertisement appropriate for the physical activity being performed by the user; and
    providing the advertisement to the user.

4. The method of claim 2, further comprising:
    receiving, at the context-aware application being executed by the processor, body language information associated with the body language feature;
    analyzing, by the context-aware application, the body language information to determine a mental state of the user;
    selecting, by the context-aware application, an advertisement appropriate for the mental state of the user; and
    providing the advertisement to the user.

5. The method of claim 2, further comprising:
    receiving, at the context-aware application being executed by the processor, body language information associated with the body language feature;
    analyzing, by the context-aware application, the body language information to determine an emotional state of the user;
    selecting, by the context-aware application, an advertisement appropriate for the emotional state of the user; and
    providing the advertisement to the user.

6. The method of claim 1, further comprising:
    receiving, at the device, information associated with a physical attribute of the user;
    creating, by the device, a body language profile based upon the information associated with the physical attribute of the user; and
    causing, by the device, the body language profile to be stored;
    and wherein selecting, by the device, the body language reference model to compare to the modified signal received from the sensor network comprises selecting, by the device, the body language reference model to compare to the modified signal received from the sensor network based, at least in part, upon the body language profile.

7. A device comprising:
    a processor; and
    a memory that stores computer-readable instructions that, when executed by the processor, cause the processor to perform operations comprising
        generating a signal,
        sending the signal to a sensor network associated with a user, wherein the sensor network comprises a plurality of vibration sensors positioned at various locations on a body of the user,
receiving a modified signal from the sensor network, wherein the modified signal comprises the signal received, from the device, by at least one vibration sensor of the plurality of vibration sensors and propagated by the at least one vibration sensor through at least one bone of the body of the user, thereby modifying the signal to create the modified signal,
selecting a body language reference model to compare to the modified signal received from the sensor network, wherein the body language reference model identifies a plurality of body language features and associated signal features,
comparing the modified signal to the body language reference model,
determining, based upon comparing the modified signal to the body language reference model, a signal feature of the modified signal that maps to a body language feature of the plurality of body language features identified in the body language reference model, and
outputting the body language feature of the plurality of body language features identified in the body language reference model to an application.

8. The device of claim 7, wherein outputting the body language feature to the application comprises outputting the body language feature to a context-aware application.

9. The device of claim 8, wherein the operations further comprise:
receiving body language information associated with the body language feature;
analyzing the body language information to determine a physical activity being performed by the user;
selecting an advertisement appropriate for the physical activity being performed by the user; and
providing the advertisement to the user.

10. The device of claim 8, wherein the operations further comprise:
receiving body language information associated with the body language feature;
analyzing the body language information to determine a mental state of the user;
selecting an advertisement appropriate for the mental state of the user; and
providing the advertisement to the user.

11. The device of claim 8, wherein the operations further comprise:
receiving body language information associated with the body language feature;
analyzing the body language information to determine an emotional state of the user;
selecting an advertisement appropriate for the emotional state of the user; and
providing the advertisement to the user.

12. The device of claim 7, wherein the operations further comprise:
receiving information associated with a physical attribute of the user;
creating a body language profile based upon the information associated with the physical attribute of the user; and
causing the body language profile to be stored;
and wherein selecting the body language reference model to compare to the modified signal received from the sensor network comprises selecting the body language reference model to compare to the modified signal based, at least in part, upon the body language profile.

13. A computer-readable storage medium having instructions stored thereon that, when executed by a processor, cause the processor to perform operations comprising:
generating a signal;
sending the signal to a sensor network associated with a user, wherein the sensor network comprises a plurality of vibration sensors positioned at various locations on a body of the user;
receiving a modified signal from the sensor network, wherein the modified signal comprises the signal received, from the device, by at least one vibration sensor of the plurality of vibration sensors and propagated by the at least one vibration sensor through at least a bone of the body of the user, thereby modifying the signal to create the modified signal;
selecting a body language reference model to compare to the modified signal received from the sensor network, wherein the body language reference model identifies a plurality of body language features and associated signal features;
comparing the modified signal to the body language reference model; and
determining, based upon comparing the modified signal to the body language reference model, a signal feature of the modified signal that maps to a body language feature of the plurality of body language features identified in the body language reference model; and
outputting the body language feature of the plurality of body language features identified in the body language reference model to an application.

14. The computer-readable storage medium of claim 13, wherein outputting the body language feature to the application comprises outputting the body language feature to a context-aware application.

15. The computer-readable storage medium of claim 14, wherein the operations further comprise:
receiving body language information associated with the body language feature;
analyzing the body language information to determine a physical activity being performed by the user;
selecting an advertisement appropriate for the physical activity being performed by the user; and
providing the advertisement to the user.

16. The computer-readable storage medium of claim 14, wherein the operations further comprise:
receiving body language information associated with the body language feature;
analyzing the body language information to determine a mental state of the user;
selecting an advertisement appropriate for the mental state of the user; and
providing the advertisement to the user.

17. The computer-readable storage medium of claim 14, wherein the operations further comprise:
receiving body language information associated with the body language feature;
analyzing the body language information to determine an emotional state of the user;
selecting an advertisement appropriate for the emotional state of the user; and
providing the advertisement to the user.

* * * * *